United States Patent [19]
Barnett

[11] Patent Number: 5,167,473
[45] Date of Patent: Dec. 1, 1992

[54] UNIDIRECTIONAL INSERT LOCK

[75] Inventor: Michael J. Barnett, Phoenix, Ariz.

[73] Assignee: Allied-Signal Inc., Morris Township, Morris County, N.J.

[21] Appl. No.: 720,077

[22] Filed: Jun. 24, 1991

[51] Int. Cl.[5] .............................................. B23P 15/28
[52] U.S. Cl. ................................... 407/104; 407/105; 407/85
[58] Field of Search ............... 407/103, 104, 105, 102, 407/73, 76, 77, 81, 83, 84, 85, 86, 88; 403/316, 317, 318, 319

[56] References Cited

U.S. PATENT DOCUMENTS

| | | |
|---|---|---|
| 3,171,188 | 3/1965 | Stier . |
| 3,268,978 | 8/1966 | Reck .................................... 407/104 |
| 3,343,431 | 9/1967 | Boyer . |
| 3,484,919 | 12/1969 | Stier . |
| 3,484,920 | 12/1969 | Werner . |
| 3,787,941 | 1/1974 | Novkov .............................. 407/105 |
| 3,889,330 | 6/1975 | Zweekly . |
| 4,209,047 | 6/1980 | Weill . |
| 4,632,593 | 12/1986 | Stashko . |
| 4,721,422 | 1/1988 | Konwal . |
| 4,876,932 | 10/1989 | Nessel . |
| 4,906,145 | 3/1990 | Oliver . |

FOREIGN PATENT DOCUMENTS

| | | | |
|---|---|---|---|
| 2239093 | 4/1973 | Fed. Rep. of Germany ...... 407/104 |
| 244009 | 7/1974 | Fed. Rep. of Germany ...... 407/105 |
| 3204999 | 8/1983 | Fed. Rep. of Germany ...... 407/104 |

Primary Examiner—Larry I. Schwartz
Assistant Examiner—J. R. Daulton
Attorney, Agent, or Firm—Jerry J. Holden; James W. McFarland; Robert A. Walsh

[57] ABSTRACT

A unidirectional insert lock for securing an insert, with a central mounting hole, to a pocket in a cutting tool is provided. The insert lock includes a locking pin having an eccentric and a radially extending lobe, and a shim having an arcuate channel angularly bordered by a first and second stop, that is configured to receive the lobe. The locking pin is inserted through holes in both the insert and the shim so that when the lobe is rotated in one direction the eccentric urges the insert into a secured cutting position within the pocket. However, when the lobe is rotated in the opposite direction the second stop prevents the pin from sufficiently rotating so that the eccentric is not able to urge the insert against the sides of the pocket, and consequently, the insert sits loosely in the pocket so that it is clear to the operator that the insert is not secured in the cutting position.

7 Claims, 2 Drawing Sheets

UNIDIRECTIONAL INSERT LOCK

TECHNICAL FIELD

This invention generally relates to locks for securing inserts in the pockets of cutting tools, and in particular, to an unidirectional insert lock that locks the insert into a cutting position when rotated in one direction and prevents the insert from being mislocated in the pocket when rotated in the opposite direction.

BACKGROUND OF THE INVENTION

There are numerous forms of prior art pin locks for securing an insert, with a central mounting hole, within a pocket in a cutting tool. For example, Boyer; U.S. Pat. No. 3,343,431 discloses a tool holder for an insert that employs a cam or eccentric to secure the insert in the holder in the cutting position and to release it therefrom. The holder has a pocket defined by a bottom surface, a side wall, and a back wall that intersects the side wall. A pin is mounted for rotation in a hole in the bottom surface of the pocket. A cam or eccentric is attached to the pin and extends into the pocket for engaging the mounting hole of the insert. The throw of the cam, the distance from the hole in the bottom surface to the walls, and the clearance between the cam, the pin and the holes in which they are located are arranged so that the insert is moved into engagement with the side wall as the pin is rotated from an initial position until the throw of the cam is normal to the side wall. Continued rotation of the pin, in the same rotational direction, forces the insert into engagement with the backwall, while it continues holding the insert in engagement with the side wall. A more detailed description of this lock pin can be found within the Boyer patent and is incorporated by reference herein. Additional prior art lock pins can be found in Stashko, U.S. Pat. No. 4,632,593, and Stier, U.S. Pat. Nos. 3,484,919 and 3,171,188.

FIG. 2A shows a prior art insert lock 2 presently used by the Applicant. The insert lock 2 includes a shim 4 having a hole for receiving a locking pin 6. The locking pin 6 includes a head portion 7 with a longitudinal axis offset from the longitudinal axis of a body portion 8. This offset forms an eccentric with a throw equal to the distance between the two axes. An insert is seated atop the shim 4 and the entire assembly is mounted in the pocket of a cutting tool. The insert lock 2 operates under the same principles as locking pin taught by Boyer. As in Boyer, if the locking pin 6 is rotated in the proper direction the head portion urges the insert into a secured, cutting position against the side and back walls of the cutting tool's pocket. However, if by mistake, the locking pin 6 is rotated in the opposite direction, then due to the interrelated geometry of the components the insert is forced against the back and side walls and is not in the cutting position even though to the operator it appears to be secured into the cutting position. This mislocation of the insert results in undersized parts and increased wear of the insert.

One proposed solution to this problem has been to place an arrow on the cutting tool indicating the proper direction of rotation for the insert lock 2. However, these arrows fade with time and even under the best of conditions are subject to operator error.

Another problem with the prior art devices is that they can be over rotated in the proper direction forcing the high point of the eccentric past the back wall, which can damage the pin.

Accordingly, a need exists for a insert lock that when rotated in the proper direction would secure the insert into the cutting position, without allowing over rotation, and when rotated in the opposite direction would prevent the insert from being mislocated within the pocket and appearing secured therein.

SUMMARY OF THE INVENTION

An object of the present invention is to provide a unidirectional insert lock for securing an insert in the pocket of a cutting tool that allows the insert to be locked in the cutting position when rotated in one direction and prevents the insert from being mislocated and appearing to be locked in the pocket when rotated in the opposite direction.

Another object of the present invention is to provide a unidirectional insert lock the prevents over rotation of the lock.

Yet another object of the present invention is to provide an unidirectional insert lock that can accomplish the prior objects in both left hand and right cutting tools.

Yet still another object of the present invention is to provide a method for converting prior art insert locks into the unidirectional insert lock contemplated by the present invention.

The present invention achieves the above-stated objective by providing a unidirectional insert lock comprising a locking pin having an eccentric and a radially extending lobe, and a shim having a arcuate channel angularly bordered by a first and second stop, that is configured to receive the lobe. When the lobe is rotated towards one of the stops the eccentric portion urges the insert into the cutting position before the lobe abuts the stop. However, when the lobe is rotated in the opposite direction the second stop prevents the pin from sufficiently rotating so that the eccentric is not able to urge the insert against the back and side walls, and consequently, the insert sits so loosely in the pocket that it is clear to the operator that the insert is not secured in the cutting position. The first stop also prevents over rotation of the lobe.

These and other objects, features and advantages of the present invention are specifically set forth in or will become apparent from the following detailed description of a preferred embodiment of the invention when read in conjunction with the accompanying drawing.

DESCRIPTION OF THE PREFERRED EMBODIMENT

Figure 1:
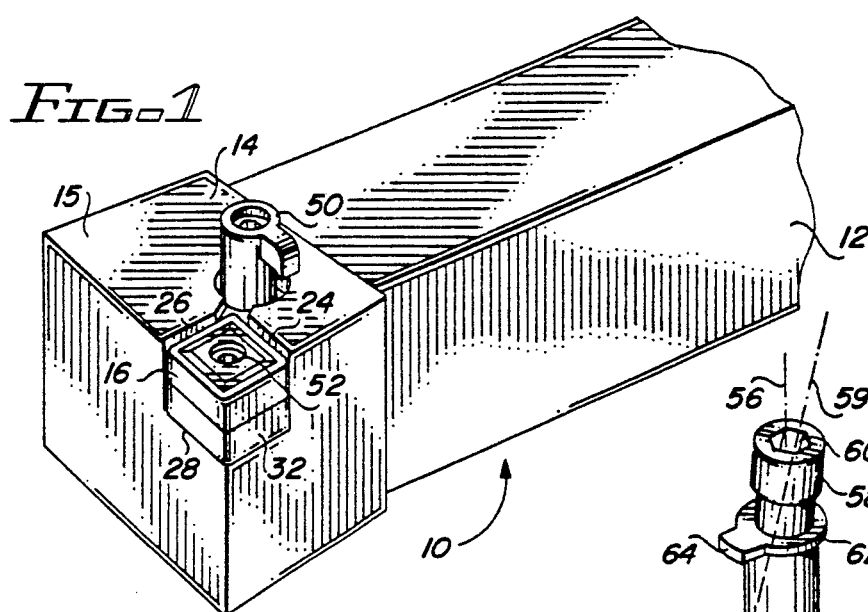
FIG. 1 is a perspective view of a cutting tool embodying the unidirectional insert lock contemplated by the present invention.
Figure 5:
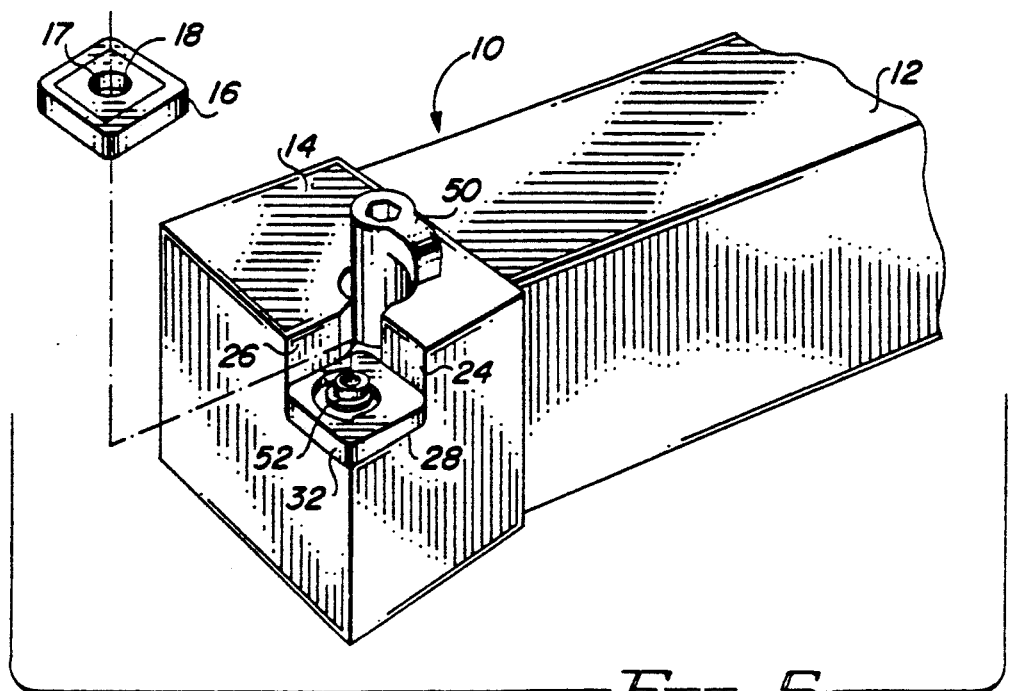
FIG. 5 is an partly exploded view of the cutting tool of FIG. 1.

A cutting tool 10 embodying the present invention is shown in FIGS. 1 and 5. The cutting tool 10 comprises a rectangular shank portion 12, elongated for mounting in the tool post of a conventional cutting machine such as a lathe, and a head portion 14 which has a pocket for containing a cutting insert 16 having a mounting hole 17 surrounded by an inner surface 18. The pocket is open at its top and at two sides, and is defined by a side wall 24, a back wall 26 and a bottom surface 28 having a central hole, (not shown), which extends through the head portion 14. The walls 24 and 26 are at right angles to each other and intersect. Both walls 24 and 26 intersect the bottom surface 28. A insert lock member 30 secures the insert 16 to the pocket. A conventional locking screw 50 is adjacent the pocket. As shown in FIGS. 1 and 5, the cutting tool 10 is left handed, however had the pocket been cut into the corner 15 of the head portion 14 than the tool 10 would be right handed. The present invention can be used with either left or right handed tools 10. While the insert 16 is shown in the drawings as being square, it should be understood that the principles of the present invention are just as applicable to inserts having different shapes such as round, triangular, rhomboid, hexagon, and pentagon.

Figure 2B:
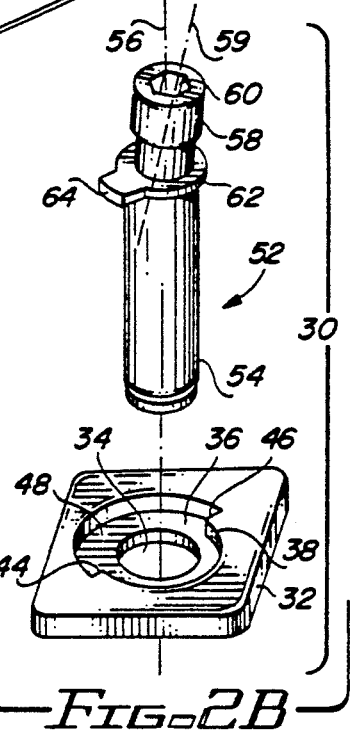
FIG. 2B is a perspective view of the unidirectional insert lock of FIG. 1.
Figure 2A:
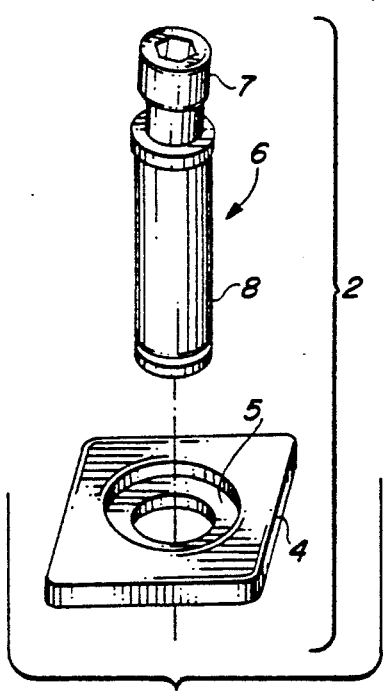
FIG. 2A is a perspective view of a prior art insert lock.

Referring to FIG. 2B, the lock member 30 is comprised of a shim 32 with the same general shape as, but slightly smaller than the cutting insert 16, and a lock pin 52. The shim 32 has a centrally located hole 34 for receiving the lock pin 52. Cut into the top surface of the shim 32 is a recess 36 defined by a circular wall 38 surrounding the hole 34. Relative to the center of the hole 34, the wall 38 as a varying radius with a first portion having a larger radius between the first and second portions is sufficiently abrupt to define two angularly spaced apart, preferably by about 180 degrees, stops 44 and 46 perpendicular to the wall 34. The wall 34 and the stops 44 and 46 define an arcuate channel 48. Alternatively, the second portion can be eliminated so that the channel 48 is bounded on it inside by the hole 34.

The lock pin 52 includes a cylindrical body 54 having a longitudinal axis 56 integral with a cylindrical head 58 adapted to engage the inner surface 18 of the insert 16. The head 58 has a longitudinal axis 59 offset from the longitudinal axis 56, thereby forming an eccentric with a throw equal to the distance between the two axes 56 and 59. Means for receiving a standard Allen wrench 60 are disposed at both ends of the lock pin 52. Circumscribing the point of intersection between the body 54 and the head 58 is an angular disk 62 having a lobe 64 extending outwardly from a portion thereof. The lobe 64 has a trapezoidal shape, angularly extending about 45 degrees, for slideably seating in the channel 48.

Referring again to FIGS. 1 and 5, the shim 32 is mounted in the pocket so that the hole 34 aligns with the hole in the bottom surface 28. The cylindrical body 54 of the lock pin 52 is inserted through these until the lobe 64 seats upon the channel 48. The insert 16 is mounted atop the shim 32 so that the peripheral surface of the cylindrical head 58 frictionally engages the inner surface 18 of the mounting hole 17.

Figure 3A:
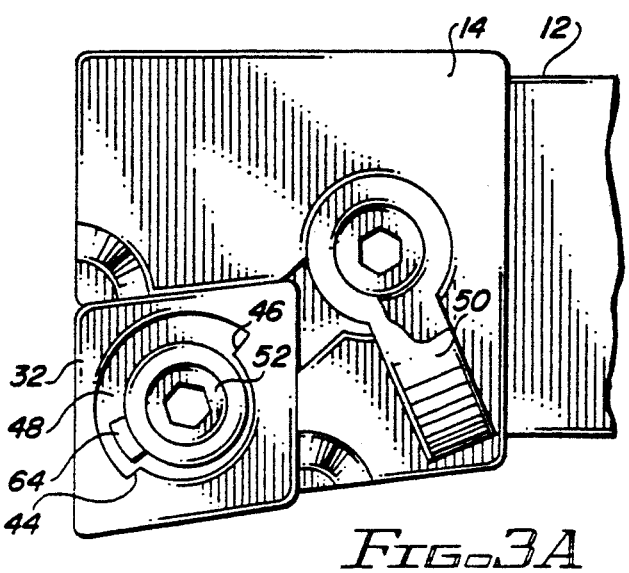
FIG. 3A is a top view of the cutting tool of FIG. 1 with the insert removed and the unidirectional insert lock in a locking configuration.
Figure 3B:
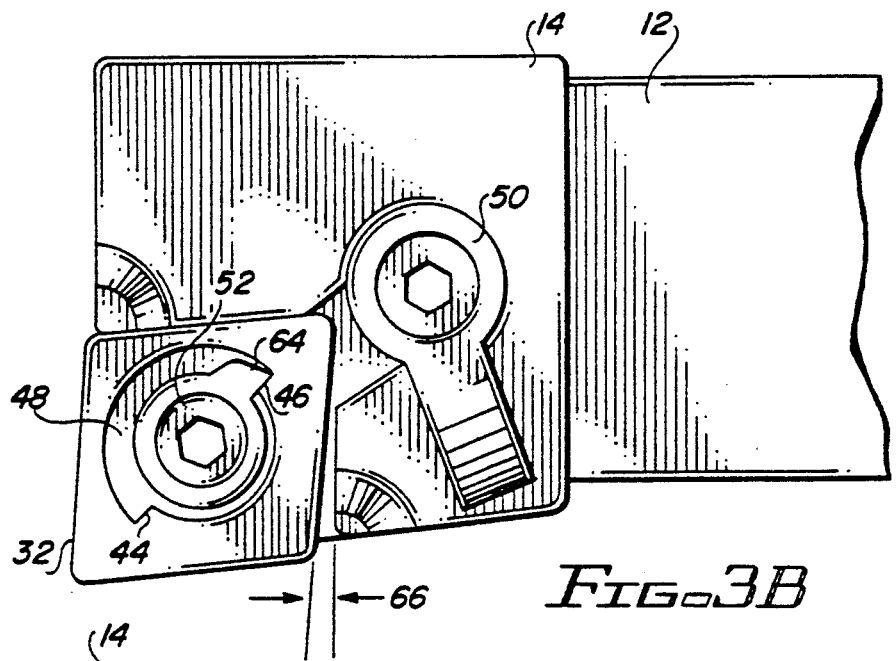
FIG. 3B is a top view of the cutting tool of FIG. 1 with the insert removed and the unidirectional insert lock in a unlocking configuration.
Figure 4A:
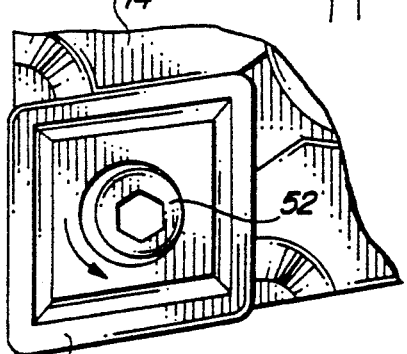
FIG. 4A shows a portion of FIG. 3A with an insert in a cutting position.
Figure 4B:
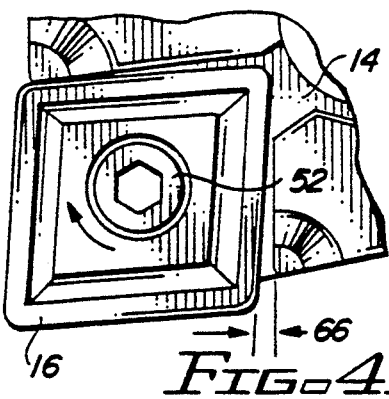
FIG. 4B shows a portion of FIG. 3B with the insert loosely held within the pocket.

Referring to FIGS. 3A and 4A, as the lock pin 52 is rotated counterclockwise about the axis 56, the cylindrical head 58, because of its throw, contacts the inner surface 18 urging the insert 16 against the side and back walls 24 and 26. The lock pin 52 and the shim 32 are configured so that before the lobe 64 comes in contact with the stop 44 the insert 16 is secured into the cutting position. Further, should the operator attempt to continue rotating the lock pin 52, the lobe 64 will contact the stop 44 and prevent over rotation. However, as the lock pin 52 is rotated clockwise about the axis 56, the stop 46 prevents the rotation from continuing to a point where the cylindrical head 58 contacts the surface 18 and therefore does not urge the insert 16 against the back and side walls 26 and 24. Thus, as shown in FIGS. 3B and 4B, when the lobe 64 abuts the stop 46 the lock pin 52 is centrally disposed within the mounting hole 17 and the shim 32 and the insert 16 sit loosely in the pocket which is illustrated by a gap 66 between the insert 16 and the side wall 24, and between the shim 32 and the side wall 24.

The cutting tool 10, as shown, is a left hand tool. However, the insert lock 30 can also be used with a right hand cutting tool. With a right hand cutting tool the foregoing description of the preferred embodiment is still accurate except that the stop 46 now functions as the stop 44 and vice versa. Therefore, the insert lock 30 can be used with both left and right hand cutting tools.

A method for transforming the prior art insert lock 2 into an insert lock contemplated by the present invention is also provided. In this transformation method the channel 48 is electro-chemically machined into the top surface of the shim 4 adjacent the recess 5. Then a metal piece is welded to the locking pin 6 so that it extends radially therefrom. The metal piece is then ground into the configuration of the lobe 64.

Various modifications and alterations to the above described system will be apparent to those skilled in the art. Accordingly, the foregoing detailed description of the preferred embodiment of the invention should be considered exemplary in nature and not as limiting to the scope and spirit of the invention as set forth in the following claims.

What is claimed is:

1. A cutting tool comprising;
   a shank portion, adapted to be mounted on a tool post of a machine, with an integral head portion, said head portion having a portion removed to form a pocket therein; said pocket defined by at least two perpendicular surfaces, one of said surfaces having a bore extending into said head portion;
   an insert configured to be seated in said pocket and having a centrally disposed mounting hole; and
   a lock member rotatably secured in said bore and said mounting hole, said lock member having an eccentric for urging said insert into a cutting position within said pocket when said lock member is rotated in a first direction, said lock member further including a first stop member for limiting the rotation of said lock member in a direction opposite of said first direction.

2. The cutting tool of claim 1 further comprising a second stop member for preventing the over rotation of said lock member in said first direction.

3. The cutting tool of claim 1 wherein said lock member further comprises;
   a substantially cylindrical lock pin having a body portion with a first longitudinal axis and a head portion with a second longitudinal axis offset from said first longitudinal axis and thereby forming said eccentric with a throw equal to the distance between said first and second axes, said lock pin having a lobe extending radially from a portion thereof; and a shim having a arcuate channel configured to receive said lobe, said channel bordered at one angular end by said first stop member, said shim mounted about said lock pin and disposed between said insert and said surface of said pocket having said bore so that said head portion is received in said mounting hole of said insert.

4. The cutting tool of claim 3 wherein said channel is bordered at a second angular end by a second stop member.

5. A unidirectional insert lock for securing an insert, with a central mounting hole, to a pocket in a cutting tool comprising;

a lock pin having a cylindrical body portion with a first longitudinal axis, and also having a cylindrical head portion adapted to engage the inner surface of said mounting hole, said head portion having a second longitudinal axis offset from said longitudinal axis, thereby forming an eccentric with a throw equal to the distance between the two axes;

a lobe partly circumscribing said lock pin and extending radially therefrom; and a shim having an arcuate channel partly circumscribing a centrally located hole for slideably receiving said lobe and bordered by two angularly spaced apart stops.

6. The unidirectional insert lock of claim 5 further comprising a circular recess disposed between said arcuate channel and said centrally located hole.

7. The unidirectional insert lock of claim 5 wherein said shim has the same general shape as said insert.

* * * * *